Dec. 10, 1929.  L. ANDRZEJEWSKI  1,738,980
BRAKE
Filed Nov. 17, 1928   3 Sheets-Sheet 2

Inventor
*Ladislaus Andrzejewski*

By *Clarence A. O'Brien*
Attorney

Dec. 10, 1929.  L. ANDRZEJEWSKI  1,738,980
BRAKE
Filed Nov. 17, 1928   3 Sheets-Sheet 3
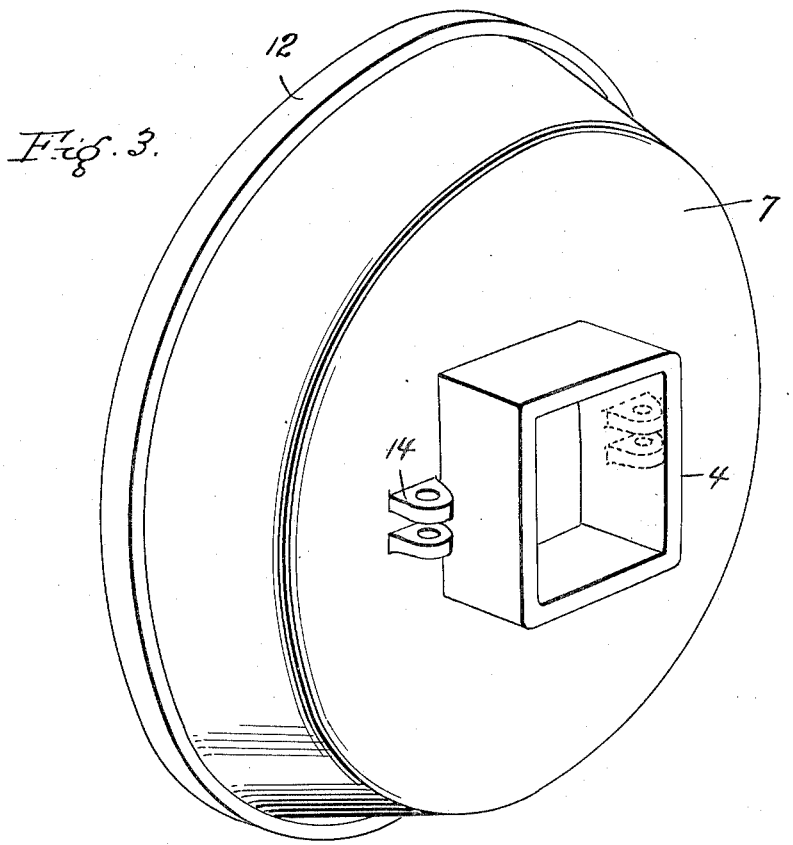
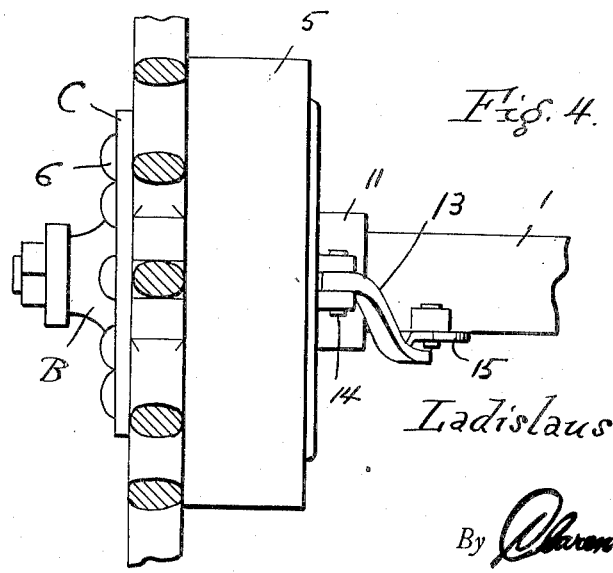
Inventor
Ladislaus Andrzejewski
By Clarence A. O'Brien
Attorney Patented Dec. 10, 1929

1,738,980

UNITED STATES PATENT OFFICE

LADYSLAWS ANDRZEJEWSKI, OF SOUTH BEND, INDIANA

BRAKE

Application filed November 17, 1928. Serial No. 320,121.

This invention relates to improvements in brakes, and particularly to those types of brakes employed on self propelled vehicles such as automobiles.

The invention aims to provide a brake mechanism exceedingly more positive and durable in use than brake mechanisms of the band type now in general use. It is understood that fluid brakes are quite positive in effect and require practically no adjustment, yet this type of brake inherently offers a certain hazard in that should the fluid system become punctured or develop a serious leak, the same will not be effective in retarding the progress of the vehicle. Mechanical brakes on the other hand require frequent adjustment to render the same as effective in use as the aforementioned fluid brakes, yet this type of brake is not hazardous in the potential manner residual of the fluid brake.

The prime object of this invention is to provide a brake of the mechanical type requiring practically no adjustments of parts.

Another serious object of the invention is to provide a brake of simple construction and wherein the parts are interconnected for positive actuation.

These and other objects of the invention will become more apparent after reading the following specification and claims.

In the drawings:

Figure 3 is a perspective view of the braking element detached from the mechanism.

Figure 4 represents a side elevation of the device slightly reduced in size over the previous views.

Figure 1:
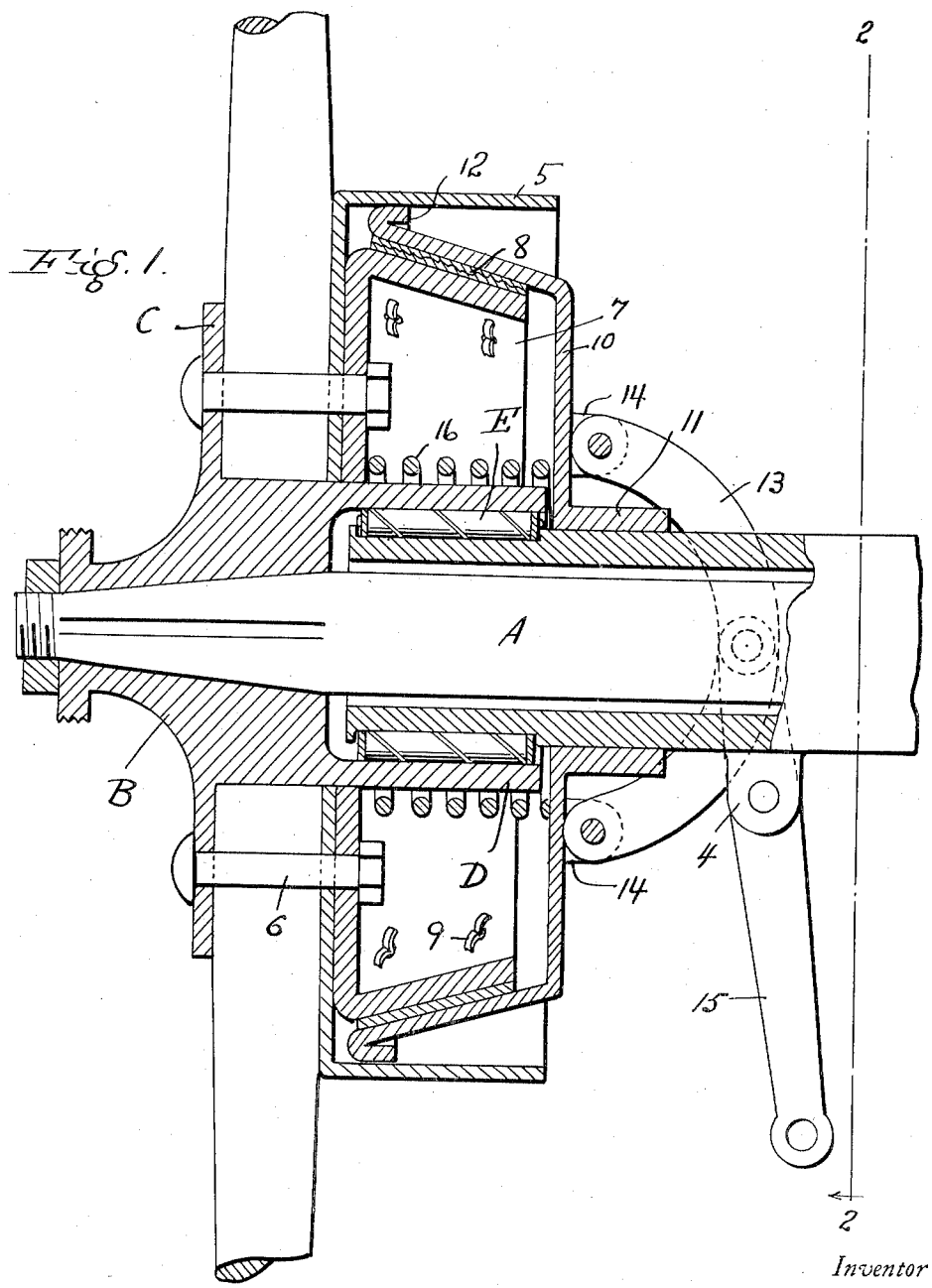
Figure 1 represents in sectional view the improved brake associated with a vehicle wheel.
Figure 2:
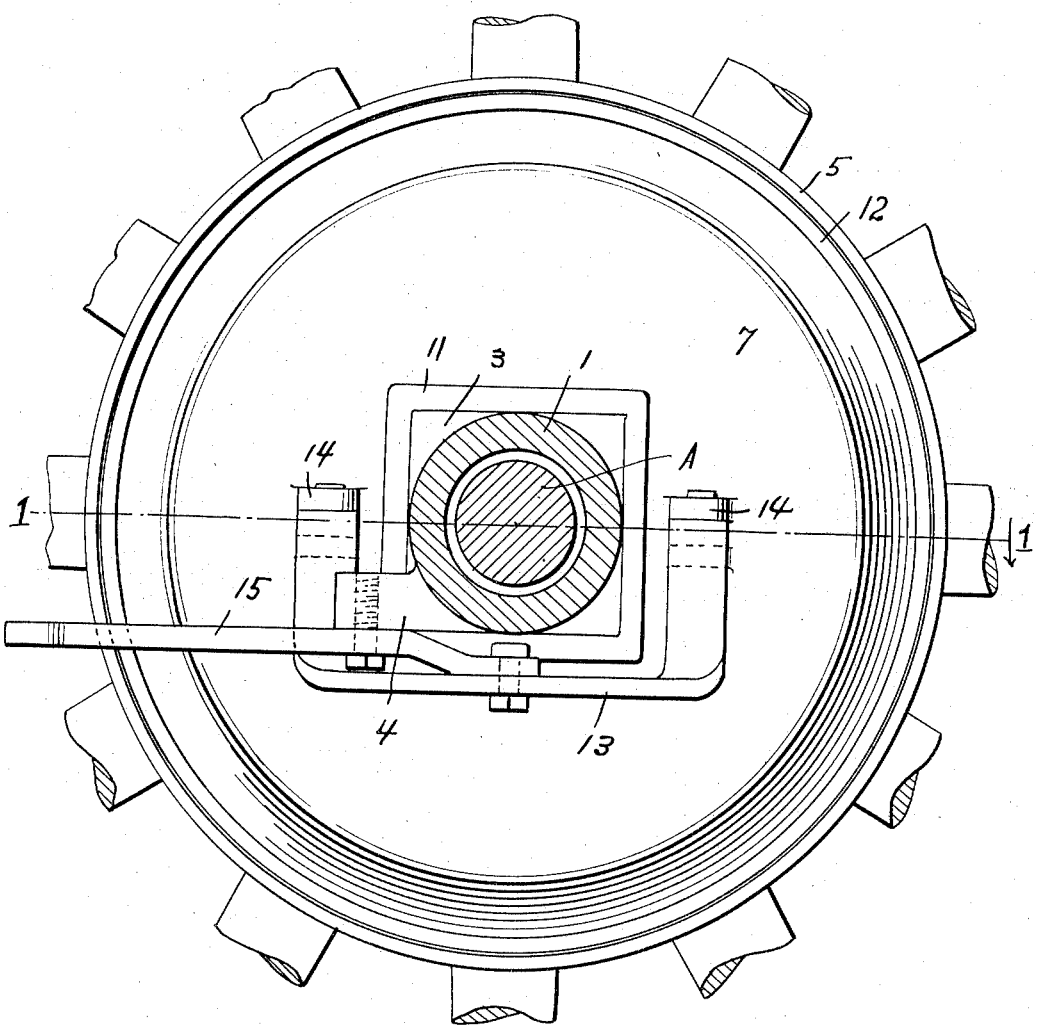
Figure 2 is a sectional view taken substantially on line 2—2 of Figure 1, and looking in the direction of the arrow.
Figure 5:
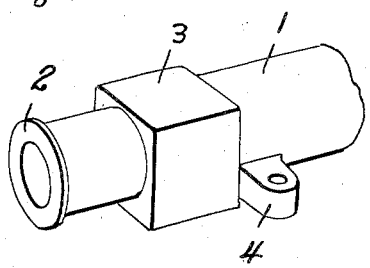
Figure 5 is a perspective fragmentary view of the specially constructed axle housing.

Referring to the drawings wherein like numerals designate like parts, an axle A is shown keyed to the usual hub structure B, as is conventional with this particular type of wheel construction, the hub B being provided with a circumferentially extending flange C adjacent its outer end and with a longitudinally extending bearing sleeve D at its inner end.

In carrying out the present invention the stationary housing for the axle A consists of a tubular body 1 through which the axle projects. Each end of the housing is provided with a circumferentially extending flange 2 and at a point inwardly from the flange formed polygonally in the manner designated by numeral 3. Slightly inwardly from the polygonal shaped portion of the housing an ear 4 projects laterally. The end portion of the housing is disposed within the sleeve D of the hub structure, and the usual roller bearings E is arranged between the flange 2 and the polygonal portion 3 antifrictionally of the hub structure.

An annular shell 5 is open at one side and closed at its opposite side. The closed side of the shell is formed centrally with an opening to permit the disposition of the bearing sleeve D therethrough, so that this closed side of the shell may be arranged on the hub structure with the usual spokes of the wheel secured in place by bolts 6 passing through these parts.

Secured by the same bolts 6 and within the shell 5 is an outwardly tapered drum 7. A suitable covering 8 of asbestos or like material is secured on the drum by suitable members 9. The drum 7 is circumferentially spaced from the peripheral wall of the shell 5.

Cooperative with the drum 7 a hollow frusto conical shaped braking element 10 is formed centrally with a polygonal shaped opening from the edge portion of which a similar shaped flange 11 projects. This flange 11 is adapted for snug slidable engagement with the polygonal portion 3 of the axle housing. The edge portion of the braking element is disposed outwardly and backwardly to provide a cylindrical guide rim 12, this rim being adapted for snug engagement within the peripheral wall of the shell 5. A semicircular bar 13 has its end portions bent upwardly and then horizontally for connection to gear members 14 at the opposite sides of the flange 11.

A lever 15 is pivotally connected at its intermediate portion to the laterally disposed ear 4 on the axle housing. One end of the lever is pivotally connected to the intermediate porton of the bar 13. For normally urging the braking element 10 outwardly a coiled spring 16 is interposed between the said element and the drum 7 in substantially the manner shown in Figure 1.

In the operation of this brake the movement of the lever 15 toward the right will result in the inward movement of the braking element 10 against the tension of the spring 16. The element will be prevented from rotating on the housing 1 by means of the polygonal shaped flange 11 acting on the polygonal portion of the housing, while the rim 12 snugly engaging within the shell 5 will guide the element at this point in its movement upon the drum 7. The engagement of the rim with the peripheral wall of the shell will permit but a small degree in expansion of the element 10, thus increasing the efficiency of the braking parts. When the lever 15 is released, the spring 16 will urge the element 10 outwardly from engagement with the drum.

Having thus described the invention, what I claim as new and desire to secure by Letters Patent is:

1. A brake comprising, a wheel carried shell, a drum within the shell, said drum and shell being arranged in radially spaced relation, and a braking element adapted for wedging engagement between said shell and the drum.

2. A brake comprising, a wheel carried shell, a drum within the shell, said drum and shell being arranged in radially spaced relation, a braking element adapted for wedging engagement between said shell and the drum, and spring means for normally urging the element out of engagement with said drum.

3. A brake comprising, a wheel carried shell, a drum secured to said shell and spaced therefrom, and a braking element for snug slidable engagement within the shell, said element being adapted for wedged engagement between the shell and the drum to effect a braking action.

4. A brake comprising, a wheel carried shell, an outwardly tapering drum mounted within the shell and rotable therewith, and a braking element adapted for wedging engagement between said drum and the shell.

5. A brake comprising, a wheel carried shell, an outwardly tapering drum mounted within the shell and rotatable therewith, and a hollow braking element adapted for engagement over said drum and for wedging engagement between said shell and the drum.

6. A brake comprising a wheel carried shell, an outwardly tapering drum mounted within the drum and rotatable therewith, an inwardly movable braking element, and a guide construction on the element to effect a wedging relation between the shell and the said drum.

7. A brake comprising, a wheel carried shell, an outwardly tapering drum mounted within the shell and rotatable therewith, a braking element adapted for wedging engagement between said drum and the shell, and means for effecting an inward movement of the element on said drum.

In testimony whereof I affix my signature.

LADYSLAWS ANDRZEJEWSKI.